(12) United States Patent
Mastrolia et al.

(10) Patent No.: US 9,783,310 B2
(45) Date of Patent: Oct. 10, 2017

(54) EJECTION SEAT PAN LIFTER

(71) Applicant: AMI Industries, Inc., Colorado Springs, CO (US)

(72) Inventors: Bradley Mastrolia, Colorado Springs, CO (US); John Hampton, Colorado Springs, CO (US); James Tulloch, Colorado Springs, CO (US); Jeremy Ochs, Colorado Springs, CO (US)

(73) Assignee: AMI INDUSTRIES, INC, Colorado Springs, CO (US)

( * ) Notice: Subject to any disclaimer, the term of this patent is extended or adjusted under 35 U.S.C. 154(b) by 429 days.

(21) Appl. No.: 14/010,009

(22) Filed: Aug. 26, 2013

(65) Prior Publication Data

US 2015/0054323 A1 Feb. 26, 2015

(51) Int. Cl.
*B64D 25/10* (2006.01)

(52) U.S. Cl.
CPC .................... *B64D 25/10* (2013.01)

(58) Field of Classification Search
CPC ........................................................ B60N 2/10
USPC ............... 297/256.13, 284.11, 313, 328, 337
See application file for complete search history.

(56) References Cited

U.S. PATENT DOCUMENTS

| | | | | |
|---|---|---|---|---|
| 2,702,677 A | * | 2/1955 | Replogle | B64D 25/10 244/122 A |
| 3,659,897 A | * | 5/1972 | Wright | A47C 7/14 267/142 |
| 3,810,674 A | * | 5/1974 | Svensson | A47C 1/03238 297/326 |
| 4,003,534 A | | 1/1977 | Kenigsberg et al. | |
| 4,301,983 A | * | 11/1981 | Horan | B64D 25/02 244/122 AG |
| 4,385,743 A | * | 5/1983 | Werner | B60N 2/0232 248/393 |
| 4,613,101 A | | 9/1986 | Herndon | |
| 4,667,901 A | | 5/1987 | Herndon | |
| 4,695,682 A | | 9/1987 | Winogrocki | |
| 4,706,194 A | | 11/1987 | Webb et al. | |
| 4,787,576 A | * | 11/1988 | McGrady | B64D 25/10 244/118.5 |
| 4,845,620 A | | 7/1989 | Parker | |
| 4,861,103 A | | 8/1989 | Vallee | |
| 5,064,146 A | | 11/1991 | Tung | |
| 5,197,007 A | | 3/1993 | Parker | |
| 5,475,592 A | | 12/1995 | Wnuk et al. | |
| 5,735,391 A | | 4/1998 | Harrell et al. | |
| 5,918,936 A | * | 7/1999 | Murphy | A61G 5/14 297/313 |
| 6,299,103 B1 | | 10/2001 | Shope et al. | |

(Continued)

FOREIGN PATENT DOCUMENTS

EP        120817      * 10/1984

*Primary Examiner* — David E Allred
(74) *Attorney, Agent, or Firm* — Cantor Colburn LLP

(57) ABSTRACT

An aircraft is provided and includes a fixed frame including a ledge and a seat pan on which seating elements for seating an aircraft crewperson are disposable. The seat pan includes a hinge about which the seat pan is pivotable relative to the fixed frame and a flange disposable on the ledge to establish a first pivot position for the seat pan relative to the fixed frame and a seat pan lifter coupled to the fixed frame and selectively interposable between the flange and the ledge to establish a second pivot position for the seat pan relative to the fixed frame.

7 Claims, 3 Drawing Sheets

(56) References Cited

U.S. PATENT DOCUMENTS

| | | | | |
|---|---|---|---|---|
| 6,568,755 | B1* | 5/2003 | Groening | B60N 2/2821 297/256.1 |
| 6,609,749 | B1 | 8/2003 | Rajasingham | |
| 6,702,383 | B2* | 3/2004 | Newman | A61G 5/14 297/313 |
| 7,156,416 | B2 | 1/2007 | Rajasingham | |
| 8,690,246 | B2* | 4/2014 | Thompson | B60N 2/1695 297/318 |
| 2012/0030870 | A1* | 2/2012 | Storm | A61G 5/1002 4/578.1 |
| 2012/0235454 | A1* | 9/2012 | Geismar | A47C 3/26 297/239 |
| 2012/0256457 | A1* | 10/2012 | Cailleteau | B60N 2/045 297/313 |
| 2013/0043705 | A1* | 2/2013 | Rajasingham | B60N 2/2812 297/183.6 |
| 2013/0239873 | A1* | 9/2013 | Dow | B63B 29/04 114/363 |

* cited by examiner

EJECTION SEAT PAN LIFTER

BACKGROUND OF THE INVENTION

The subject matter disclosed herein relates to an ejection seat of an aircraft and, more particularly, to a pan lifter of an ejection seat of an aircraft.

Aircraft, such as modern military aircraft, are often required to accommodate smaller pilots than the cockpits were designed to fit. This is partially due to an increase in the number of female pilots being in service and the fact that female pilots tend to be smaller than their male counterparts. While, in some cases, existing seats can be maneuvered for pilot comfort, it is often the case that the existing seats cannot travel upward enough to handle the new, smaller female pilots. Indeed, for some pilots, there may be a need for several inches of adjustment.

Presently, there are options for cushions that can be attached to the seat pan to raise the smaller pilots up. These cushions have to be stored separately, however, which makes their use inconvenient. Consequently, they are rarely used.

BRIEF DESCRIPTION OF THE INVENTION

According to one aspect of the invention, an aircraft is provided and includes a fixed frame including a ledge and a seat pan on which seating elements for seating an aircraft crewperson are disposable. The seat pan includes a hinge about which the seat pan is pivotable relative to the fixed frame and a flange disposable on the ledge to establish a first pivot position for the seat pan relative to the fixed frame and a seat pan lifter coupled to the fixed frame and selectively interposable between the flange and the ledge to establish a second pivot position for the seat pan relative to the fixed frame.

According to another aspect of the invention, an aircraft ejection seat assembly is provided and includes a seat pan on which seating elements for seating first and second aircraft crewpersons of differing heights are disposable, the seat pan being pivotable about a hinge and configured to assume a first pivot position associated with the first aircraft crewperson and a seat pan lifter configured to selectively cause the seat pan to pivot beyond the first pivot position and to thereby establish a second pivot position associated with the second aircraft crewperson.

According to yet another aspect of the invention, a method for adjusting a height of a seat pan of an aircraft is provided and includes stowing a seat pan lifter securely in the aircraft in a non-use position such that the seat pan assumes a first height associated with a first aircraft crewperson being seated on the seat pan and selectively interposing the seat pan lifter between the seat pan and a fixed-height ledge such that the seat pan assumes a second height associated with a second aircraft crewperson being seated on the seat pan.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Most aircraft ejection seats, such as those found in military aircraft, have a seat pan that hinges in the front of the seat and is held up on a ledge in the back. The survival kit may be stored underneath this seat pan. In accordance with aspects, a block spacer is installed on the ledge to accommodate extra small pilots or aircraft occupants. When not in use, this block spacer is stored next to the survival kit and should be retained so it will not come free during ejection procedures and become a hazard. The additional height adjustment occurs as a result of the block spacer being interposed between the ledge and the seat pan and effectively tilting the seat pan about the hinge to lift the seat pan. The block spacer can therefore be used to lift a relatively small pilot or occupant an inch or two when the existing seat pan geometry does not otherwise allow for such an adjustment. Thus, since smaller pilots or occupants will be able to fit into the aircraft, the aircraft will be able to accommodate an increased population range.

Figure 1:
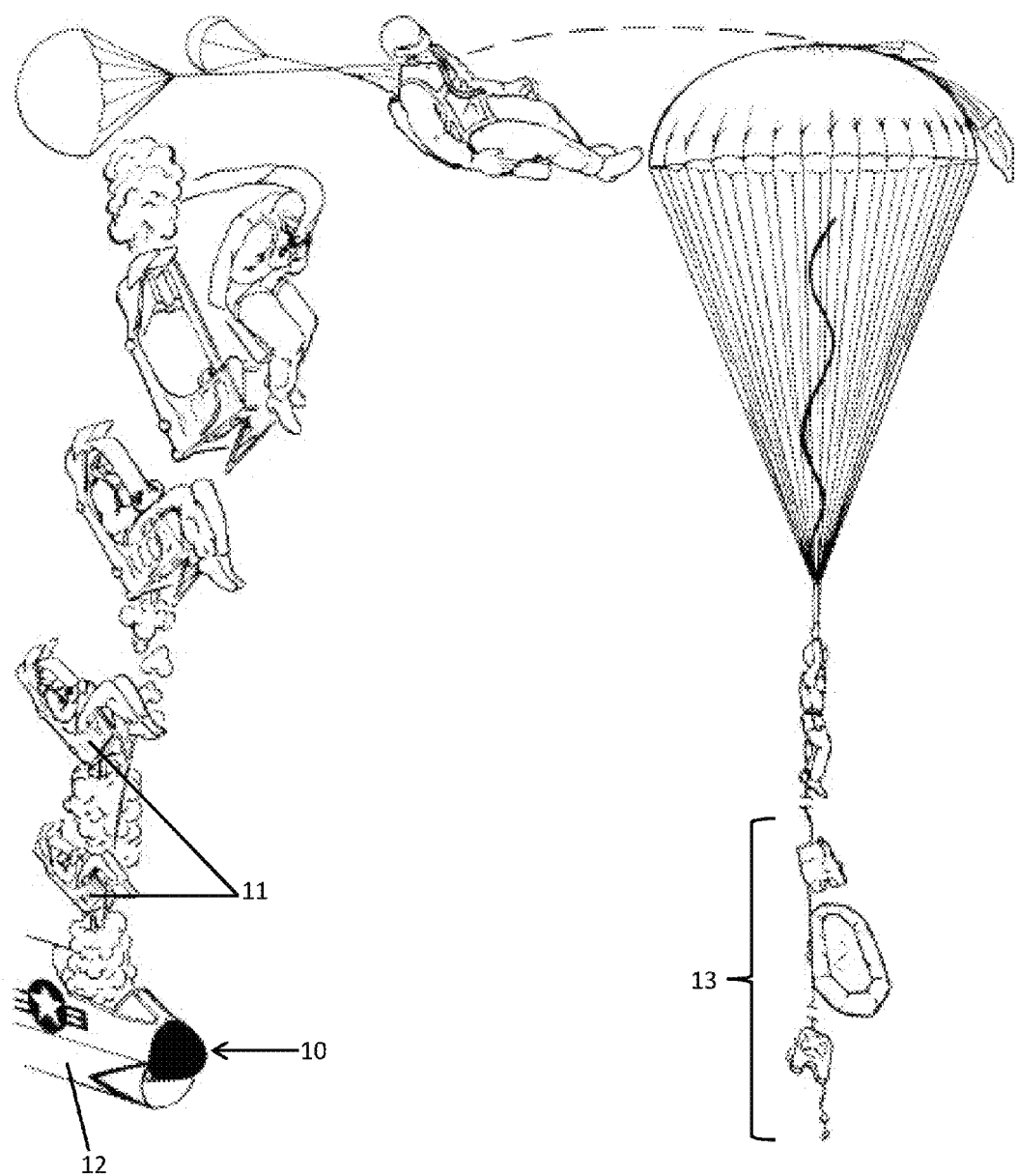
FIG. 1 is a diagram of an ejection seat of an aircraft.

With reference to FIG. 1, an aircraft 10 is provided. The aircraft 10 may be a military aircraft, such as a jet, a private aircraft or a commercial aircraft. The aircraft 10 includes an ejection seat 11, on which the pilot or occupant (hereinafter "pilot") sits while operating or riding in the aircraft 10, and fuselage 12, which is formed to define a cabin. In certain circumstances, the pilot may be compelled to initiate an ejection during which boosters attached to the ejection seat 11 are fired such that the ejection seat 11 and the pilot are ejected from the fuselage 12. Once the ejection occurs, the pilot's parachute opens and he/she is removed from the ejection seat 11 along with his/her survival kit 13, which was previously stowed underneath the ejection seat 11.

Figure 2:
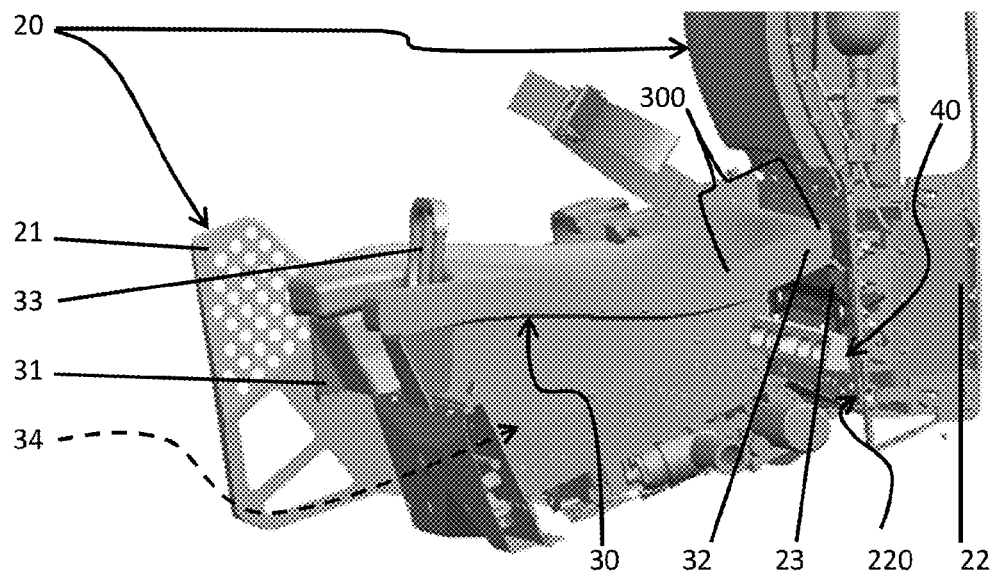
FIG. 2 is a perspective view of an ejection seat including a seat pan lifter disposed in a stowed location in accordance with embodiments.
Figure 3:
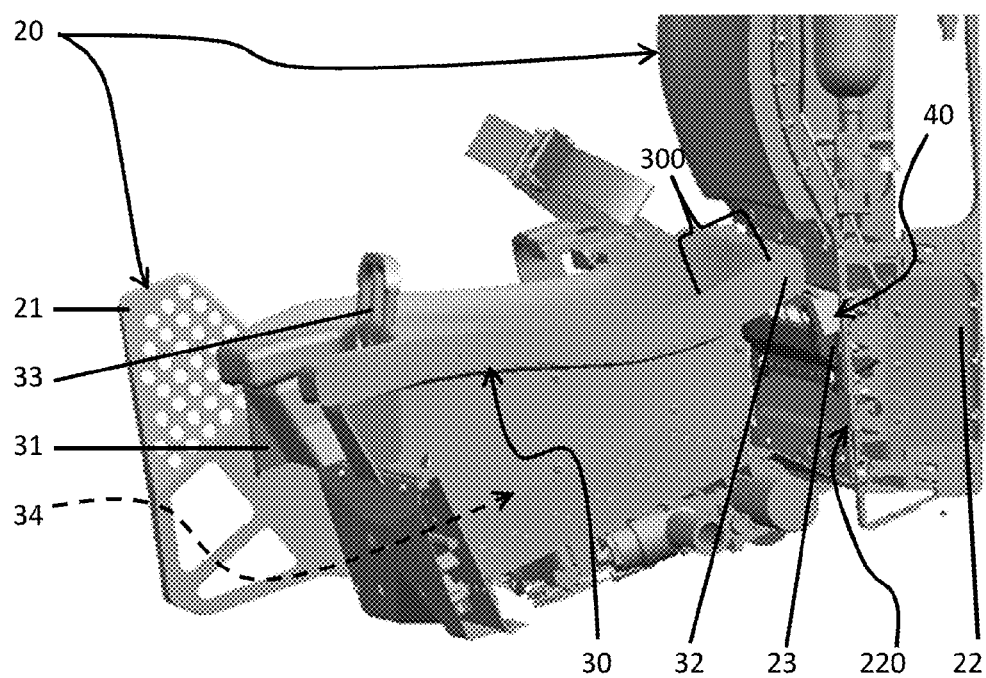
FIG. 3 is a perspective view of the ejection seat including the seat pan lifter of FIG. 1 disposed in an in-use location.
Figure 4:
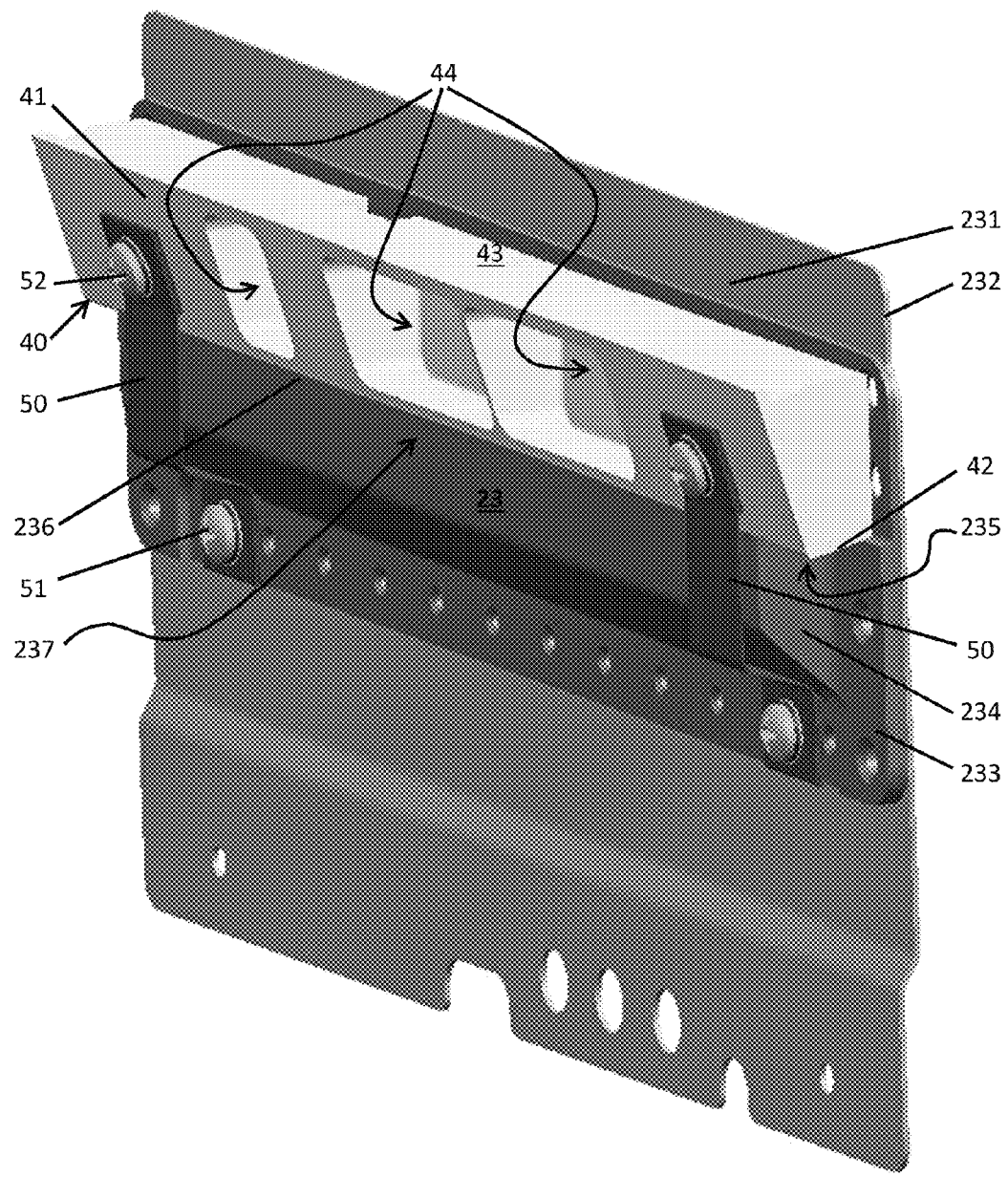
FIG. 4 is an enlarged view of the seat pan lifter of FIGS. 2 and 3 disposed in an in-use position.

With reference to FIGS. 2-4, the ejection seat 11 includes a fixed frame 20 and a seat pan 30 on which seating elements (i.e., a cushion) are disposable for seating at least a first aircraft crewperson having a first height and a second aircraft crewperson having a second height, which is different from the first height. The seat pan 30 is configured for ejection from the aircraft 10 and includes a hinge 31 at a front of the seat pan 30 about which the seat pan 30 is pivotable relative to the fixed frame 20, a flange 32 and a handle 33. The handle 33 is disposed at the front of the seat pan 30 and is proximate to the hinge 31 so that it is easily accessible to the pilot. The fixed frame 20 includes a side panel 21 that is configured to support the hinge 31, a rear block 22 and a ledge 23. The rear block 22 is disposed at a rear of the seat pan 30 and includes a front face 220 on which the ledge 23 is disposed.

The flange 32 is formed at a rear portion 300 of the seat pan 30 and is disposable on the ledge 23 to establish a first pivot position for the seat pan 30 about the hinge 31 relative to the fixed frame 20. That is, the flange 32 mechanically interferes with the ledge 23 such that the seat pan 30 is prevented from pivoting (e.g., clockwise in FIG. 2) about the hinge 31 beyond the first pivot position due to gravity. This first pivot position may be regarded as establishing a first height of the seat pan 30 relative to the fixed frame 20 and may be associated with the first aircraft crewperson.

The ejection seat 11 further includes a seat pan lifter (i.e., the above-mentioned "block spacer") 40. The seat pan lifter 40 is coupled to the front face 220 of the rear block 22 of the fixed frame 20 and is selectively interposable in an in-use position between the flange 32 and the ledge 23. When interposed in the in-use position between the flange 32 and the ledge 23, the seat pan lifter 40 effectively increases the height of the ledge 23, which is otherwise of a fixed height relative to the fixed frame 20, and mechanically interferes with the flange 32. This prevents the seat pan 30 from pivoting (e.g., clockwise in FIG. 2) about the hinge 31 beyond a second pivot position due to gravity and effectively causes the seat pan 30 to pivot about the hinge 31 beyond the first pivot position (e.g., counter-clockwise in FIG. 3). The seat pan lifter 40 thus establishes the second pivot position or second height for the seat pan 30 about the hinge 31 relative to the fixed frame 20, which may be associated with the second aircraft crewperson.

The first pivot position (i.e., the first height) for the seat pan 30 may be ideal or close to an ideal seating position for the first crewperson. By contrast, where the second crewperson is shorter than the first crewperson by an amount that is beyond the adjustment capability of the ejection seat 11 as a whole, the second pivot position (i.e., the second height) may permit the second crewperson to occupy the seat pan 30 in an ideal or close to ideal seating position. As such, the aircraft 10 will be able to occupy a greater population of pilots with a correspondingly increased range of pilot heights.

The ejection seat 11 may further include a survival kit 34. The survival kit 34 is normally stowed underneath the seat pan 30 and is coupled to the pilot's gear such that the survival kit 34 ejects from the aircraft 10 and remains with the pilot. During normal flight, the seat pan lifter 40 is selectively disposable in a non-use position where the seat pan lifter 40 is proximate to the survival kit 34 underneath the seat pan 30.

As shown in FIG. 4, the ledge 23 may be provided as a plate-shaped member 231 having a first planar section 232, a second planar section 233 that protrudes from the first planar section 232 and a third planar section 234 that protrudes from the second planar section 233. With this configuration, the second and third planar sections 233 and 234 form a lip 235 extending forwardly from the first planar section 232. The third planar section 234 further includes an upwardly extending flange 236, which, along with the lip 235, is formed to define a pocket-shaped upper side 237 of the ledge 23.

In accordance with embodiments, the ejection seat 11 may further include one or more securing members 50. The one or more securing members 50 may be configured to flexibly or rigidly connect the seat pan lifter 40 to the fixed frame 20. More particularly, the one or more securing members 50 may be configured to flexibly or rigidly connect the seat pan lifter 40 to the second planar section 233 of the ledge 23. This connection may be formed by way of first fastening elements 51 that can be used to fasten the one or more securing members 50 to the second planar section 233 and by second fastening elements 52 that can be used to fasten the one or more securing members 50 to the seat pan lifter 40.

In accordance with further embodiments, the one or more securing member 50 may be formed of flexible, semi-rigid or rigid sheet metal or similar materials such that the seat pan lifter 40 can be secured in place whether the seat pan lifter 40 occupies the non-use position (see FIG. 2) or the in-use position (see FIGS. 3 and 4). Where the one or more securing members 50 are formed of semi-rigid or rigid sheet metal or similar materials, the seat pan lifter 40 can be moved from the non-use position to the in-use position by unfastening the first fastening elements 51 from the second planar section 233, rotating the one or more securing members 50 about the second fastening elements 52, placing the seat pan lifter 40 on the ledge 23 and re-fastening the first fastening elements 51 to the second planar section 233. This process can be reversed to move the seat pan lifter 40 from the in-use position to the non-use position. The process can also be inverted by unfastening and re-fastening the second fastening elements 52 from the seat pan lifter 40 and rotating the one or more securing members 50 about the first fastening elements 51.

In accordance with alternative embodiments, the one or more securing members 50 may be configured to be semi-rigid or rigid in a first position, which is associated with the non-use position of the seat pan lifter 40, and in a second position, which is associated with the in-use position of the seat pan lifter 40. In this case, the one or more securing members 50 may be further configured to be selectively operated to assume one or the other of the first or second positions without the need for unfastening and re-fastening of the first or second fastening elements 51, 52.

As shown in FIGS. 2-4, the seat pan lifter 40 includes a body 41, a narrow side 42 and a wide side 43, which is defined on the opposite side of the body 41 from the narrow side. The narrow side 42 is configured to be received in the pocket-shaped upper side 237 of the ledge 23 when the seat pan lifter 40 is disposed in the in-use position and the wide side 43 is configured to abut the flange 32. In order to decrease a weight of the seat pan lifter, the body 41 may be formed to define one or more cavities 44.

In accordance with further aspects, a method for adjusting a height of the seat pan 30 of the aircraft 10 is provided. The method includes stowing the seat pan lifter 40 securely in the aircraft 10 in the non-use position (see FIG. 2) such that the seat pan 30 assumes a first pivot position (i.e., a first height) associated with a first aircraft crewperson being seated on the seat pan 30. The stowing may include connecting the seat pan lifter 40 to the fixed frame 20. The method further includes selectively interposing the seat pan lifter 40 between the seat pan 30 and the ledge 23, which has a fixed-height relative to the fixed frame 20 such that the seat pan 30 assumes a second pivot position (i.e., a second height) associated with a second aircraft crewperson being seated on the seat pan 30.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An aircraft ejection seat assembly, comprising:
    a fixed frame including an elongate ledge extending lengthwise in a direction transverse to a forward direction;
    a seat pan on which seating elements for seating first and second aircraft crewpersons of differing heights are disposable,
    the seat pan being pivotable about a hinge connected at a front edge of the seat pan and configured to assume a first pivot position associated with the first aircraft crewperson; and
    a seat pan lifter comprising an elongated block selectively disposed lengthwise in the transverse direction on the ledge at a rear end of the seat pan, the seat pan lifter configured to thereby establish and support the seat pan in a second pivot position associated with the second aircraft crewperson;
    wherein the seat pan pivots about the hinge relative to the fixed frame as the seat pan is pivoted from the first pivot positions to the second pivot position.

2. The aircraft ejection seat assembly according to claim 1, wherein the seat pan is configured for ejection from the aircraft.

3. The aircraft ejection seat assembly according to claim 1, wherein the seat pan comprises an ejection handle proximate to the hinge.

4. The aircraft ejection seat assembly according to claim 1, wherein the seat pan comprises a survival kit, the seat pan lifter being selectively disposable in a non-use position proximate to the survival kit.

5. The aircraft ejection seat assembly according to claim 1, further comprising securing members connectable to the seat pan lifter.

6. The aircraft ejection seat assembly according to claim 1, wherein the seat pan lifter has a tapered cross-section.

7. The aircraft ejection seat assembly according to claim 1, wherein the seat pan lifter comprises a body formed to define one or more cavities.

* * * * *